(12) United States Patent
Lindt et al.

(10) Patent No.: US 12,198,410 B2
(45) Date of Patent: Jan. 14, 2025

(54) IMAGE ANALYSIS MODEL COMPRISING A DISCRETE COUPLING LAYER

(71) Applicant: Robert Bosch GmbH, Stuttgart (DE)

(72) Inventors: Alexandra Lindt, Hamburg (DE); Emiel Hoogeboom, Amsterdam (NL); William Harris Beluch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 526 days.

(21) Appl. No.: 17/650,779

(22) Filed: Feb. 11, 2022

(65) Prior Publication Data

US 2022/0277554 A1   Sep. 1, 2022

(30) Foreign Application Priority Data

Mar. 1, 2021   (DE) ...................... 10 2021 104 804.4

(51) Int. Cl.
*G06V 10/774*    (2022.01)
*G06V 10/82*     (2022.01)

(52) U.S. Cl.
CPC .......... *G06V 10/7747* (2022.01); *G06V 10/82* (2022.01)

(58) Field of Classification Search
CPC .. G06V 10/7747; G06V 10/82; G06V 10/454; G06V 20/56; G06N 3/084; G06N 20/00
See application file for complete search history.

(56) References Cited

U.S. PATENT DOCUMENTS

| | | | | |
|---|---|---|---|---|
| 2021/0019619 A1* | 1/2021 | Bhattacharyya | ..... | G06N 3/0455 |
| 2021/0019621 A1* | 1/2021 | Bhattacharyya | ....... | G06N 3/045 |
| 2021/0286953 A1* | 9/2021 | Meng | ...................... | G06N 3/08 |

OTHER PUBLICATIONS

Hoogeboom, Emiel, et al. "Integer discrete flows and lossless compression." Advances in Neural Information Processing Systems 32 (2019). (Year: 2019).*
Tran, Dustin, et al. "Discrete flows: Invertible generative models of discrete data." Advances in Neural Information Processing Systems 32 (2019). (Year: 2019).*
Kingma, Diederik P. "Adam: A method for stochastic optimization." arXiv preprint arXiv:1412.6980 (2014). (Year: 2014).*

(Continued)

*Primary Examiner* — Edward F Urban
*Assistant Examiner* — Jongbong Nah
(74) *Attorney, Agent, or Firm* — NORTON ROSE FULBRIGHT US LLP; Gerard A. Messina

(57) ABSTRACT

A computer-implemented method of training an image analysis model. The image analysis model comprises a coupling layer that determines an output vector of discrete values from an input vector of discrete values. First, a machine learnable submodel of the coupling layer is trained to predict a second input part of the coupling layer from a first input part of the coupling layer. Next, the image analysis model is trained. This involves applying the coupling layer by applying the machine learnable submodel to the first input part to obtain a prediction of the second input part; and determining a second output part by applying an invertible mapping to the second input part defined by the prediction of the second input part. The mapping maps a predicted value of an element of the second input part to a fixed value independent from the predicted value.

15 Claims, 5 Drawing Sheets

(56) References Cited

OTHER PUBLICATIONS

Tran et al., "Discrete Flows: Invertible Generative Models of Discrete Data," Cornell University Library, 2019, pp. 1-11. https://arxiv.org/abs/1905.10347.pdf.

Hoogeboom et al., "Integer Discrete Flows and Lossless Compression," 33rd Conference on Neural Information Processing Systems (NEURIPS 2019), Vancouver, Canada, 2019, pp. 1-11. https://proceedings.neurips.cc/paper/2019/file/9e9a30b74c49d07d8150c8c83b1ccf07-Paper.pdf Downloaded Feb. 10, 2022.

Kingma et al., "Adam: A Method for Stochastic Optimization," Cornell University, 2017, pp. 1-15. https://arxiv.org/pdf/1412.6980.pdf.

\* cited by examiner

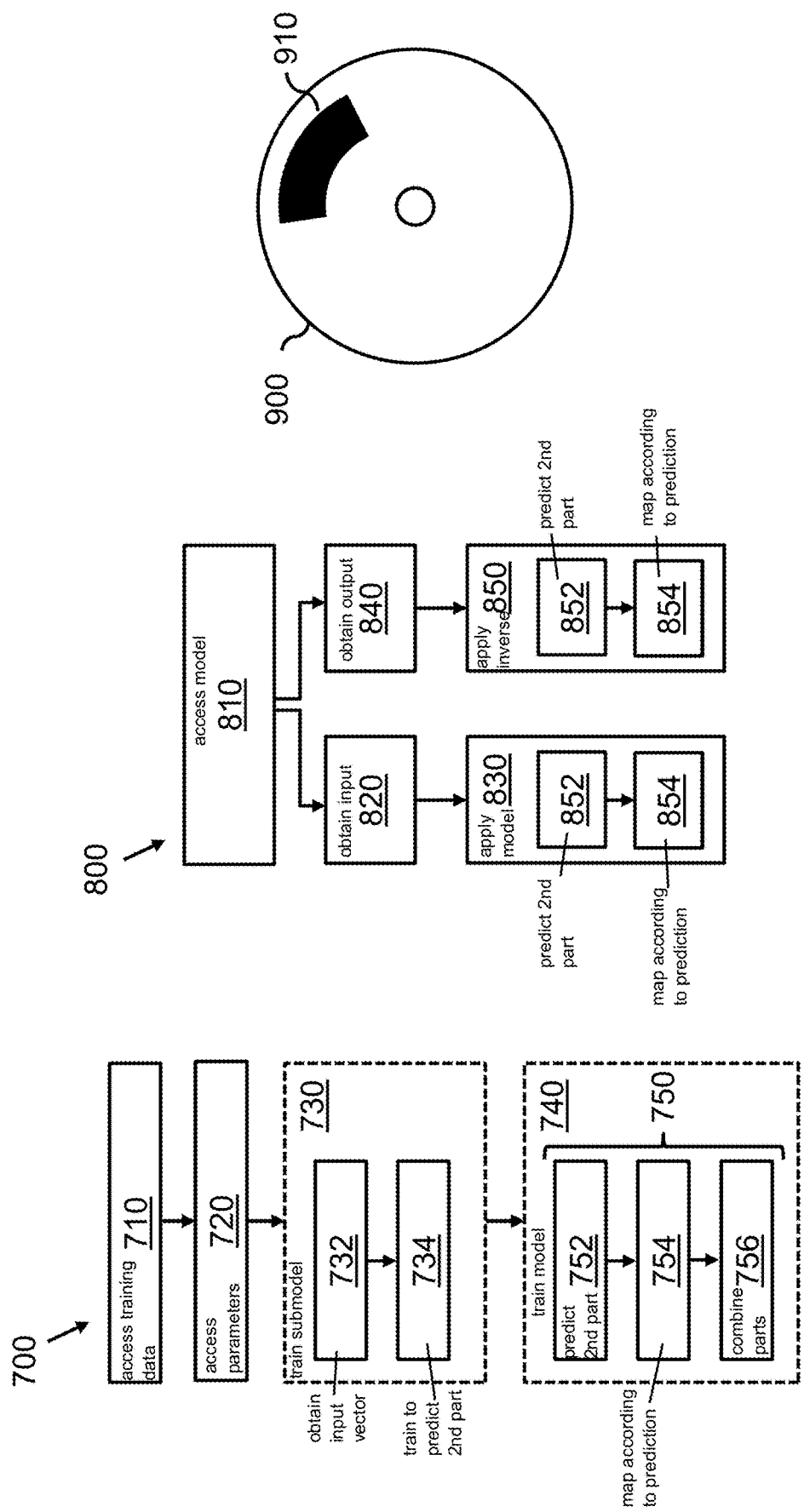

IMAGE ANALYSIS MODEL COMPRISING A DISCRETE COUPLING LAYER

CROSS REFERENCE

The present application claims the benefit under 35 U.S.C. § 119 of German Patent Application No. DE 10 2021 104 804.4 filed on Mar. 1, 2021, which is expressly incorporated herein by reference in its entirety.

FIELD

The present invention relates to a computer-implemented method of training an image analysis model, and to a corresponding system. The present invention further relates to a computer-implemented method of applying the trained image analysis model, and to a corresponding system. The present invention further relates to a computer-readable medium.

BACKGROUND INFORMATION

Automated image analysis using machine learning is used in a wide variety of applications. For example, in autonomous or semi-autonomous vehicles, image analysis is used to detect dangerous traffic situations. Similarly, in the medical world, analysis of MRI scans, CT scans, or other types of medical images can be used to detect anomalies, to classify tumours, and the like. In many applications, it is particularly useful if an image analysis model is, at least approximately and/or stochastically, invertible. For example, this enables the model to be used for generating synthetic images by applying it in the inverse direction. Another application that this enables is image compression. Image analysis can be used to represent an image in terms of values drawn from a probability distribution. By using shorter encodings for values that are more common according to the probability distribution, lossy or even lossless image compression can be achieved.

In the paper "Discrete Flows: Invertible Generative Models of Discrete Data" by D. Tran et al. (available at https://arxiv.org/abs/1905.10347 and incorporated herein by reference), flow-based models for discrete data are presented. Since images are typically stored in discrete form, e.g., as black-and-white images or using 8-bit pixels values, it is advantageous to model them with a model that can handle discrete data. This avoids problems that non-discrete models, e.g., continuous models, have when working with discrete data. For example, to deal with discrete data such as images, non-discrete models may apply latent space quantization, resulting in reconstruction errors in the image space. In particular, non-discrete models with latent space quantization are not suited for lossless compression. Models that work directly on discrete data avoid this problem. In particular, the abovementioned paper describes a discrete invertible function in the bipartite flow setting, also known as a coupling layer.

SUMMARY

In the conventional coupling layer, during training, backpropagation through the is performed using a straight-through gradient estimator. The training uses the non-differentiable argmax operation. This makes it necessary to an approximation during training involving a so-called temperature value. In this approximation, a balance must be struck between making the temperature value small in order to limit the bias of the gradient estimator, and making the temperature value not to small in order to avoid problems with vanishing gradients. The need to make this trade-off inhibits the optimality of the found solutions. For example, efficiency of image compression, accuracy of anomaly detection, or representativeness of generated images to the training dataset is impacted.

This is a problem in particular when using several such coupling layers in sequence. In such cases, bias accumulates, and vanishing gradients are more likely. Thus, the quality of the trained model is more severely affected. However, in many cases it is needed to use multiple layers, e.g., to model more complex training sets.

It would be desirable to train an image analysis model with discrete coupling layers in such a way that the trained model has improved performance, in particularly when using multiple discrete coupling layers in sequence.

In accordance with a first aspect of the present invention, a computer-implemented method and a corresponding system are provided for training an image analysis model. In accordance with another aspect of the present invention, a computer-implemented method and a corresponding system are provided for applying the trained image analysis model. In accordance with an aspect of the present invention, a computer-readable medium is described.

Various measures relate to an image analysis model with an improved discrete coupling layer. The coupling layer may be configured to determine an output vector of discrete values from an input vector of discrete values. For example, the discrete values can be bits, or 4-bit values $\{0, 1, \ldots, 15\}$. The coupling layer may comprise a machine learnable submodel that is trained to predict a second input part of the input vector from a first input part of the input vector. When applying the model, an invertible mapping may be applied to the second input part that is defined by this prediction. The mapping may map a predicted value of an element of the second input part to zero. For example, if the element of the second input part is predicted to have value x, and that prediction is correct, then the corresponding element of the second output part may be set to zero. Instead of zero, any other fixed value that is independent from the predicted value x can be used as well.

Interestingly, the described coupling layer effectively disentangles the input vector. If the machine learnable submodel can perfectly predict the second input part from the first input part, then the element of the second input part is always mapped to the fixed value. In this way, the knowledge that the first input part provides about the second input part may be effectively removed from the second input part. Such disentangling is advantageous in image analysis because it effectively allows to separate different aspects of the input image. For example, the input image may be described in terms of values drawn from a joint probability distribution of several respective probability distributions over parts of the model output. By disentangling the input, these respective probability distributions may be trained to represent separate aspects of the input image.

Moreover, the use of such machine learnable submodels has the advantage that they can be trained separately from the overall image analysis model. For example, the coupling layer may be applied to the input image of the model itself, in which case the machine learnable submodel may be trained to predict a second part of the input image from a first part of the input image. This training typically does not access or modify parameters of other parts of the image analysis model. Having trained the submodel, the remainder of the image analysis model can then be trained, e.g., keeping the submodel fixed.

Problems with bias and vanishing gradients in existing coupling layers are avoided for several reasons. First, the submodel does not have to give a discrete output. For example, the submodel can provide a continuous output, e.g., it can be a conventional convolutional neural network. Thus, the submodel can be trained with conventional training techniques, and problems with bias and vanishing gradients due to the discrete setting are avoided. When training the remainder of the image analysis model, the submodel does not need to be optimized anymore, so these problems are also avoided in that phase. For example, no rounding of the outputs of the submodel needs to be taken care of. Such rounding is common when dealing with discrete data but also is a common source of undesired bias in training. Moreover, due to separately training the coupling layers, when several coupling layers are placed in sequence, problems due to accumulating bias are avoided. The coupling layers can be separately trained, e.g., in an in biased way, so that bias does not accumulate over multiple layers. By being able to divide the training into smaller sub-problems, also convergence and overall efficiency of the training are improved.

As a consequence, an image analysis model can be trained that provides better performance, e.g., increased accuracy, on the tasks that it is applied to. In particular, the advantageous image analysis model may be applied in at least two ways: first, by obtaining an input image and applying the image analysis model to the input image to obtain a model output, and second, by obtaining a model output and applying an inverse of the image analysis model to the model output to obtain an input image. The use of a coupling layer is beneficial because it allows the model to be used efficiently in both directions, since it is invertible. Another advantage of the coupling layer described herein is that it may be deterministic both in the forward and in the inverse direction. This is advantageous for various applications, including image compression, where it is desired that the model consistently provides the exact same outcome.

Optionally, applying the machine learnable submodel may comprise applying a convolutional neural network, or any other type of neural network. Neural networks, and convolutional neural networks in particular, are particularly suited for image analysis, e.g., to extract low-level or mid-level features from images. Thus, using such models as machine learnable submodels results in good performance for images. Interestingly, despite such models typically providing continuous model outputs, they can still be used in the coupling layer provided herein without the need for rounding during training, since the submodel may be fixed during training and its outputs may be used indirectly to define a mapping on discrete values instead of being directly added to the discrete values, for example.

Optionally, the element of the second input part that is mapped to a fixed value if predicted, is a bit. The input vector to which the coupling layer is applied, may be a bit vector. In this case, it is particularly natural to disentangle the value based on its prediction. For example, the bit may be flipped if it is predicted to be set and kept unchanged if it is not predicted to be set, e.g., the bit may be XORed with its prediction. Thus, if the bit is correctly predicted, it may be set to zero. It is also possible to flip the bit if it is predicted not to be set, and keep the bit unchanged if it is predicted to be set. Thus, if the bit is correctly predicted, it may be set to one. Performing the operations on bits has the advantage that fixing where the correctly predicted value is mapped to, may automatically also fix where a wrongly predicted value is mapped to, and that existing classification models may be used.

Optionally, a further machine learnable submodel of a further coupling layer may be trained. An input vector of this further coupling layer may be based on the output vector of the coupling layer. Thus, coupling layers may be placed in sequence, and may also be trained in sequence. For a subsequent layer, the earlier trained layers may be used to determine the input to the coupling layer. For example, the model may comprise a sequence of at least two, at least five, or at least ten coupling layers. As also discussed elsewhere, in case of such stacking it is particularly advantageous to perform separate training of the coupling layers, e.g., to prevent bias accumulation and to improve training performance.

Optionally, the training of the image analysis model may leave the parameters of trained coupling layers fixed. In such cases, no further optimization of these coupling layers is performed, and thereby, problems accompanying such training may be avoided. In other cases, the parameters of the coupling layers may also be updated during the training of the image analysis model. In this case, since the parameters of the coupling layers already have good starting values, problems with their training may in any case be greatly reduced while it is still possible to fine-tune the behaviour of the coupling layers based on the needs of the remainder of the model.

Optionally, the image analysis model may be configured to determine a representation of an input image in terms of a set of values drawn from a probability distribution, e.g., a joint distribution of several sub-distributions. Such a representation may be used for example for (lossless or lossy) image compression, synthetic image generation, anomaly detection, feature extraction, or may be input to a further machine learning model. Models representing images in terms of values drawn from a probability distribution are also advantageous since they can be effectively trained by maximum likelihood estimation, e.g., by maximizing log-likelihoods of input images according to a probability distribution on input images induced by the image analysis model.

The image analysis models described herein have many practical applications, several of which are now discussed.

In an example embodiment of the present invention, the model may be used for compression and decompression of an input image. To compress, the image analysis model may be applied to the input image, and a lossy or lossless compression function may be applied to the model output to obtain a compression of the input image. To decompress, a lossy or lossless decompression function may be applied to a compression of an input image to obtain the model output, and the inverse of the image analysis model may be applied to the model output to recover the input image. The coupling layer described herein may enable efficient evaluation of the model in both directions. Moreover, because the model output is more representative of the training dataset, better compression of images that are similar to those of the training dataset is achieved. Interestingly, this often leads to better general-purpose compression as well.

In an example embodiment of the present invention, the image analysis model may be used for anomaly detection. The image analysis model may be applied to the input image to obtain the model output, wherein the model output represents the input image in terms of values drawn from a probability distribution. Based on the values, a conformance value may be determined, for example, by a likelihood estimation. The conformance value may indicate a conformance of the input image to the training dataset. The conformance value may be output, e.g., the value may result in further action: e.g., an alert may be raised if an insufficient conformance, e.g., an anomaly, is detected. By using an image analysis model as described herein, accuracy of the determined conformance is improved.

In an example embodiment of the present invention, the image analysis model may be used to generate synthetic images. The model output may represent an input image in terms of a set of values drawn from a probability distribution. A model output may be obtained by sampling the values from the probability distribution. The sampling and/or sampled model output may be customized to manipulate the image generation as desired. The inverse of the image analysis model may be applied to the model output to determine a synthetic image representative of the training dataset. Image analysis models as described herein are particularly suited for synthetic image generation since they may be efficiently evaluated in the inverse direction, including the coupling layer; and because by using a coupling layer as described herein, images can be generated that are more representative of the training dataset. Synthetic data can be used for various applications, such as training set augmentation for training a task-specific upstream model, e.g., a deep neural network. The provided techniques thereby result in better upstream models as well.

In an example embodiment of the present invention, the image analysis model may be used as a feature extractor for a control system for controlling a computer-controlled machine, e.g., a robot, an autonomous or semiautonomous vehicle, a domestic appliance, a manufacturing machine, or a personal assistant. The control system may capture an input image of the machine and/or its environment; apply the image analysis model to the input image to obtain a model output; and use the model output to control the machine, e.g., to determine a control signal to be provided to an actuator for controlling the machine. For example, the control system may apply a further machine learning model to determine the control signal, e.g., trained using reinforcement learning or the like. Because the model output more accurately represents the input image, or in other words, is more optimal in terms of feature extraction, better control may be achieved.

The provided techniques are applicable to various types of images, e.g., camera images or videos, radio images, LiDAR data, ultrasonic data, motion data, or thermal images. Various other types of data can be represented as images and in this way be processed using the provided techniques as well, audio data or time-series data being examples. The model also does not need to be an image analysis model, e.g., it can be a model trained on and used for non-image data, such as audio data or time-series sensor data. Various data that is represented as discrete units can be processed using the described models and the described coupling layer in particular, leading to the discussed advantages.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 7 shows a computer-implemented method of training a model, in accordance with an example embodiment of the present invention.

FIG. 8 shows a computer-implemented method of applying a model, in accordance with an example embodiment of the present invention.

FIG. 9 shows a computer-readable medium comprising data, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
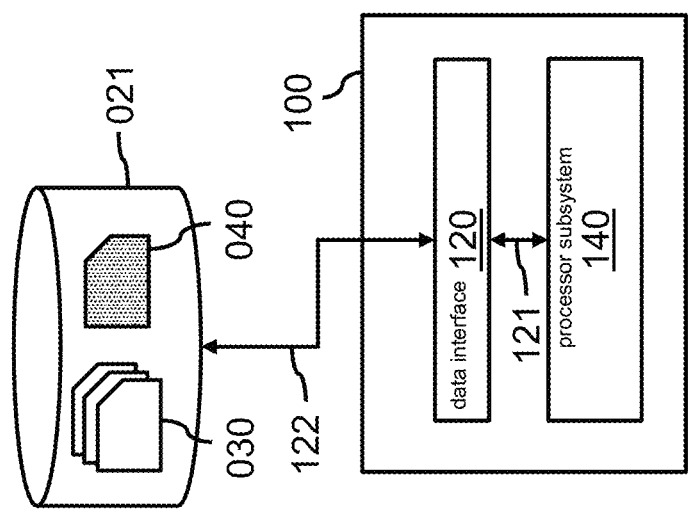
FIG. 1 shows a system for training a machine learning model, in accordance with an example embodiment of the present invention.

FIG. 1 shows a system 100 for training a machine learning model.

The system 100 may comprise a data interface 120 for accessing a training dataset 030. The training dataset 030 may comprise one or more training input instances for the machine learning model, for example, at least 1000 or at least 100000 training input instances. In an embodiment, the machine learning model may be an image analysis model, with the training input instances being training images. For example, a training image may be at least 32×32 or at least 128×128 in size, and may have one (greyscale or black-and-white), three (RGB, etc.) or more channels. However, the machine learning model may also be applicable to various other input instances, e.g., sensor data such as audio data or time-series sensor data. Although images are used throughout this specification as a motivating example, the skilled person can readily adapt the presented techniques to other kinds of input data.

The model may comprise one or more coupling layers as described herein. Such a coupling layer may be configured to determine an output vector of discrete values from an input vector of discrete values.

The data interface 120 may also be for accessing a set of parameters 040 of the model. For example, the number of parameters 040 may be at least 10000, at least 100000, or at least 1000000. The set of parameters 040 may comprise parameters of a machine learnable submodel of a coupling layer of the model. The parameters may be for use according to a method described herein, e.g., by system 200 of FIG. 2 or system 300 of FIG. 3.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140. Processor subsystem 140 may be configured to, during operation of the system 100, train the machine learnable submodel of the coupling layer. This training may comprise obtaining an input vector of the coupling layer corresponding to a training image of the training dataset, and training the machine learnable submodel to predict a second input part of the input vector from a first input part of the input vector.

Processor subsystem 140 may be further configured to train the overall machine learning model on the training dataset. This training may keep the parameters of the coupling layer fixed. The training may comprise applying the coupling layer to an input vector to obtain an output vector. To apply the coupling layer, processor subsystem 140 may be configured to apply the machine learnable submodel to a first input part of the input vector to obtain a prediction of a second input part of the input vector. Processor subsystem 140 may be further configured to apply an invertible mapping to the second input part to obtain a second output part. The mapping may be defined by the prediction of the second input part. The mapping may map a predicted value of an element of the second input part to a fixed value independent from the predicted value. Processor subsystem 140 may be further configured to combine the first input part and the second output part to obtain the output vector.

The system 100 may further comprise an output interface for outputting trained parameters 040 of the learned (or 'trained') model. For example, as also illustrated in FIG. 1, the output interface may be constituted by the data interface 120, with said interface being in these embodiments an input/output ('IO') interface, via which the trained parameters 040 may be stored in the data storage 021. For example, parameters 040 of the 'untrained' model may during or after the training be replaced, at least in part, by the parameters 040 of the trained model, in that the parameters of the model, such as weights and other types of parameters of neural networks, may be adapted to reflect the training on the training data 030. This is also illustrated in FIG. 1 by the same reference numerals 040 being used to denote untrained and trained parameters in the data storage 021. In other embodiments, the trained parameters may be stored separately from the untrained parameters. In some embodiments, the output interface may be separate from the data interface 120, but may in general be of a type as described above for the data interface 120.

Figure 2:
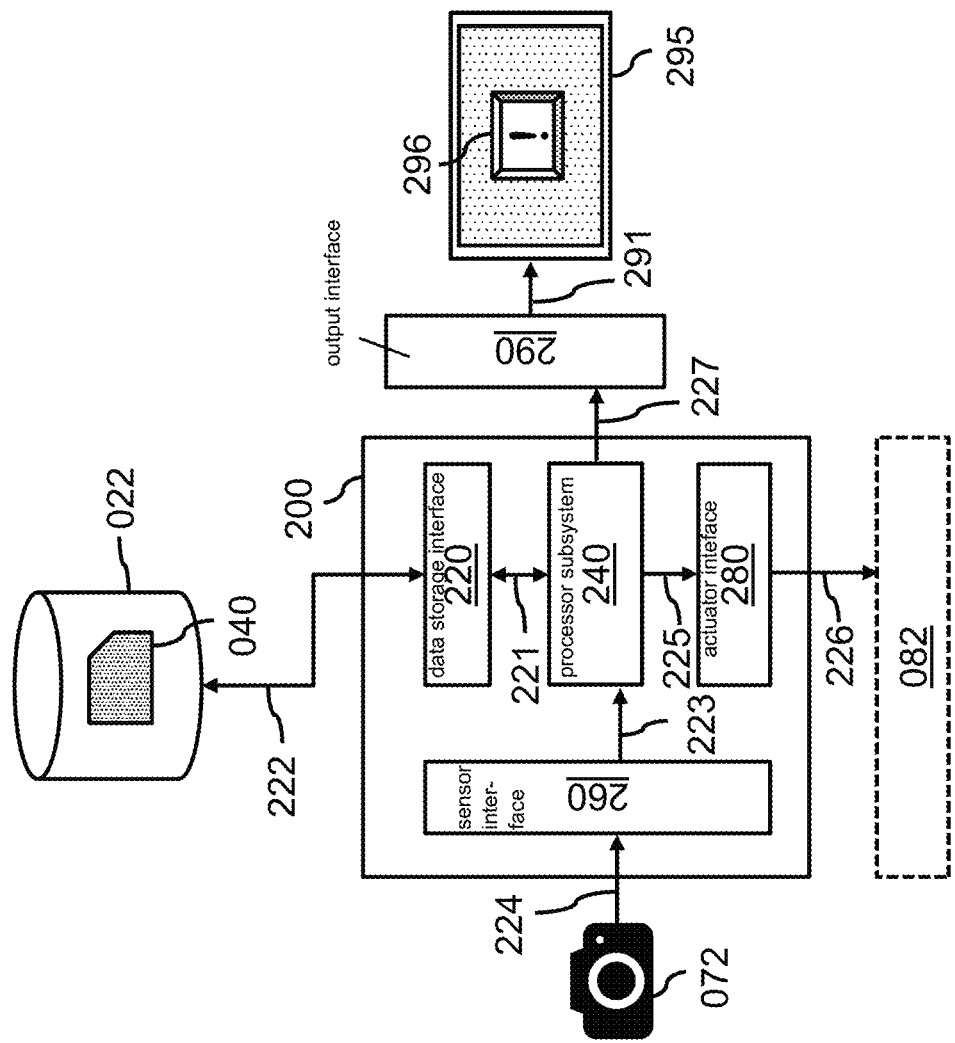
FIG. 2 shows a system for applying a machine learning model, in accordance with an example embodiment of the present invention.

FIG. 2 shows a system 200 for applying a machine learning model. The machine learning model can be an image analysis model or other type of model, as also discussed with respect to FIG. 1. The model may comprise a coupling layer configured to determine an output vector of discrete values from an input vector of discrete values.

The system may comprise a data interface for accessing a set of parameters 040 of the model. The model may have been trained on a training dataset according to a method described herein, e.g., by system 100 of FIG. 1. The set of parameters 040 may comprise parameters of a machine learnable submodel of the coupling layer. The system may train the model in addition to applying it, e.g., the system 200 may be combined with the system 100 of FIG. 1.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and the data storage 021. The data storage 022 may further comprise an input instance, e.g., sensor data, to which the model is applied in a forward direction, and/or a model output to which the model is applied in an inverse direction.

The system 200 may further comprise a processor subsystem 240 which may be configured to, during operation of the system 200, apply the model. Processor subsystem 240 may apply the model in the forward and/or inverse direction. When applying the model in the forward direction, processor subsystem 240 may be configured to obtain an input instance, e.g., an input image, and apply the model to the input instance to obtain a model output. When applying the model in the inverse direction, processor subsystem 240 may be configured to obtain a model output and apply an inverse of the model to the model output to obtain an input instance, e.g., an input image.

Both when applying the model in the forward model and when applying the model in the inverse direction, processor subsystem 240 may be configured to apply the machine learnable submodel to a first input part of an input vector of the coupling layer to obtain a prediction of a second input part of the input vector; and to apply an invertible mapping to the second input part to obtain a second output part of an output vector of the coupling layer. The mapping may be defined by the prediction of the second input part. The mapping may map a predicted value of an element of the second input part to a fixed value independent from the predicted value.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for accessing sensor data 224 acquired by a sensor 072 in an environment 082. The model may then be applied in the forward direction to the sensor data. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. In the example illustrated in the figure, the sensor 072 is an image sensor, e.g., a camera. The sensor data 224 may be image data, e.g., video data, radar data, LiDAR data, ultrasonic data, motion data, or thermal image data. In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on 12C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on a model output of applying the model in the forward direction. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-) autonomous vehicle.

In other embodiments, the system 200 may comprise an output interface 290 to a rendering device 295, such as a display, a light source, a loudspeaker, a vibration motor, etc., which may be used to generate a sensory perceptible output signal 296 which may be generated based on a model output determined by applying the model in the forward direction, or of a model input determined by applying the model in the inverse direction. The sensory perceptible output signal 296 may be directly indicative of the determined model output or input, but may also represent a derived sensory perceptible output signal, e.g., for use in guidance, navigation or other type of control of the physical system.

In some embodiments, system 200 may be configured to generate one or more synthetic model inputs, e.g., images, representative of the training dataset on which the model has been trained. The generated synthetic model inputs may for example be used, by system 200 or another system, to train a further machine learning model. For example, the model output may represent model inputs in terms of a set of values drawn from a probability distribution. Processor subsystem 240 may be configured to obtain the model output by sampling the values from the probability distribution; and to apply the inverse of the model, in other words, to apply the model in the inverse direction, to the model output to determine a synthetic model input representative of the training dataset. For example, the output interface may be used to output the generated model inputs or a further machine learning model trained based on it. This is an example of an application of the model in which a sensor interface and actuator interface are not needed.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Figure 3:
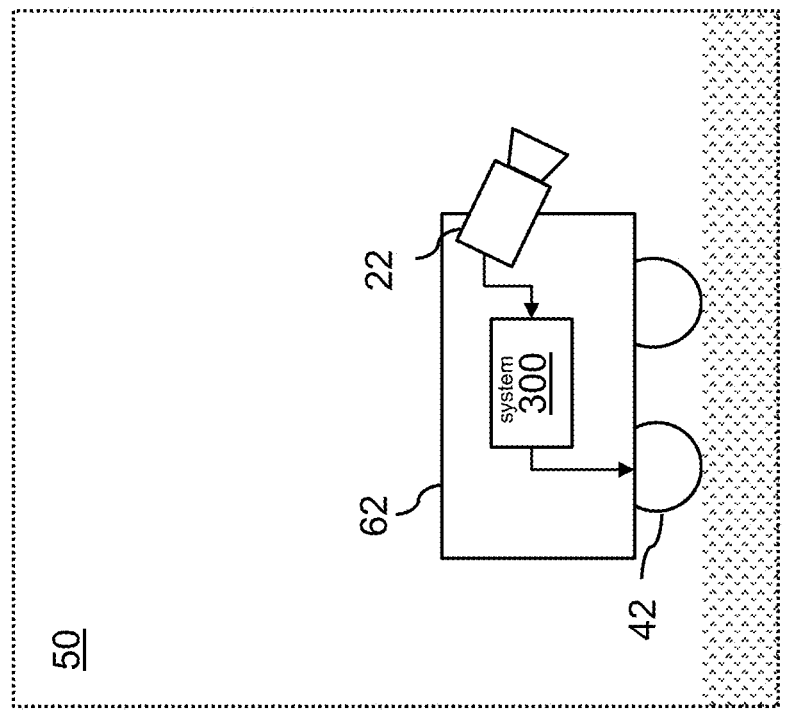
FIG. 3 shows an example of a use of a trained image analysis model in a control system of an (semi-) autonomous vehicle.

FIG. 3 shows an example of the above, in that the system for applying the model is shown to be a control system 300 of an (semi-) autonomous vehicle 62 operating in an environment 50. The autonomous vehicle 62 may be autonomous in that it may comprise an autonomous driving system or a driving assistant system, with the latter also being referred to as a semiautonomous system. The autonomous vehicle 62 may for example incorporate system 300 to control the steering and the braking of the autonomous vehicle based on sensor data obtained from a video camera 22 integrated into the vehicle 62.

For example, the system 300 may control an electric motor 42 to perform (regenerative) braking in case the autonomous vehicle 62 is in an unexpected traffic situation. The system 300 may control the steering and/or braking to avoid accidents. For that purpose, the system 300 may apply the model to an input image of the environment 50 of the vehicle 62, thus obtaining a model output. The model output may represent the input image in terms of a set of values drawn from a probability distribution. Based on this set of parameters, a conformance value may be determined. The conformance value may indicate a conformance of the input image to the training dataset. If the conformance value indicates insufficient conformance, an unexpected traffic situation may be detected and appropriate action may be taken. Instead of or in addition to steering/breaking, this may involve alerting the driver and/or switching to a manual driving mode, for example.

As another example, the control system 300 may use the image analysis model as a feature extractor for use in controlling the vehicle 62. For example, detection of an unexpected traffic situation or other controlling of the vehicle 62 may be performed by a further machine learning model based on the model output of the image analysis model.

Figure 4A:
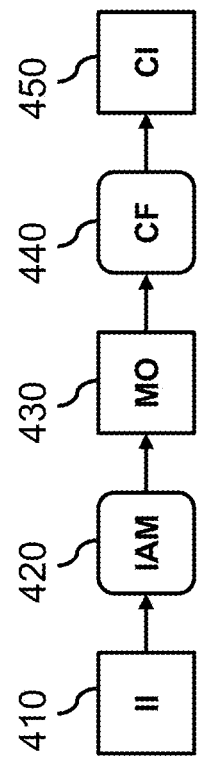
FIG. 4A shows a detailed example of how to compress an image, in accordance with an example embodiment of the present invention.

FIG. 4A shows a detailed, yet non-limiting, example of how to compress an image using an image analysis model IAM, 420, as described herein. The image analysis model IAM is applied to an input image II, 410, to obtain a model output MO, 430, for example, a set of values drawn from a probability distribution. A compression function CF, 440, may be applied to the model output MO to obtain a compression CI, 450, of the input image II. The compression function can be lossless or lossy. Examples of compression functions that work on a values drawn from a probability distribution are given in E. Hoogeboom et al., "Integer Discrete Flows and Lossless Compression" (available at https://arxiv.org/abs/1905.07376 and incorporated herein by reference).

Figure 4B:
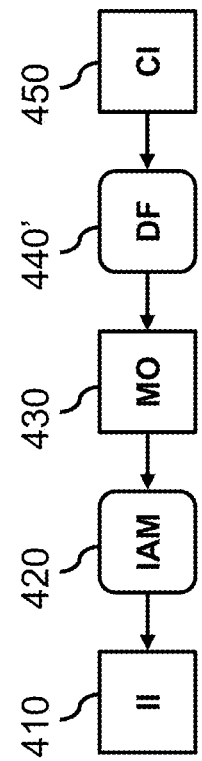
FIG. 4B shows a detailed example of how to decompress an image, in accordance with an example embodiment of the present invention.

FIG. 4B shows a detailed, yet non-limiting, example of how to decompress an image using an image analysis model IAM, 420, as described herein. In this example, a decompression function DF, 440', may be applied to a compression CI, 450, of an input image to obtain the model output MO, 430. The decompression function DF may be lossy or lossless, and can optionally be progressive. The inverse of the image analysis model IAM may be applied to the model output MO, in other words, the model IAM may be applied in the inverse direction, to recover the input image II, 410. Examples of compression functions are given in "Integer Discrete Flows and Lossless Compression"; in these examples, model output MO represents a set of values drawn from a probability distribution.

Figure 5A:
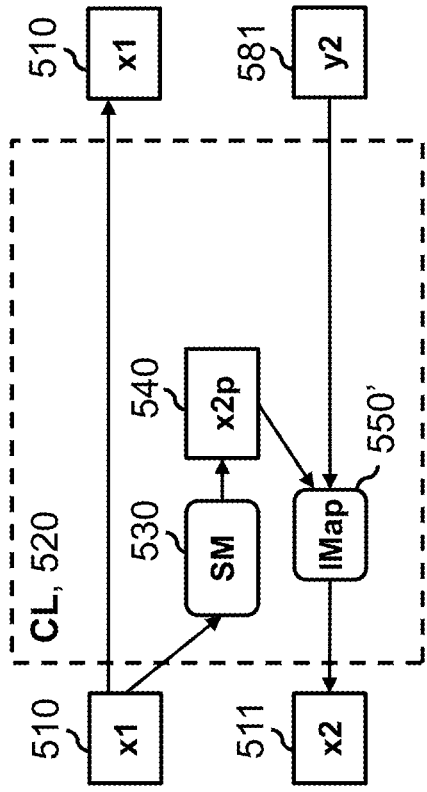
FIG. 5A shows a detailed example of how to apply a coupling layer, in accordance with an example embodiment of the present invention.

FIG. 5A shows a detailed, yet non-limiting, example of how to apply a coupling layer CL, 520, in the forward direction. This example is applicable both to training a model comprising a coupling layer an to applying such a model.

Coupling layer CL may be configured to determine an output vector of discrete values from an input vector of discrete values. For example, the values can be bits or values from another finite domain, e.g., of at most or at least 3, at most or at least 10, or at most or at least 32 possible values. The discrete values can also be values from an infinite set, e.g., the set of integers or natural numbers. The discrete values can be ordinal values, e.g., values having an ordering, such as numbers modulo a given modulus; or nominal values, e.g., values without an ordering or of which the ordering is in any case not used.

The domains of the input and output vectors are typically the same, and also the input and output vectors are typically of the same size, but this is not strictly necessary, e.g., it is possible to define an invertible mapping by having twice as many elements that can have half as many possible values. The input vector and/or the output vector may comprise at least 16, at least 32, or at least 128 values, for example. The term "vector" means here data comprising multiple values; it does not preclude the input or output vectors from having a particular structure, e.g., the input and/or output vector may represent or comprise a two-dimensional or three-dimensional volume, e.g., an activation volume. For example, the output vector may be an activation volume with the same dimensions as the input vector, or may be obtained from the input vector e.g., by decreasing the spatial dimensions and increasing the number of channels, or the other way around.

Thus, applying a model comprising coupling layer CL may comprise applying a first part of the model to a model input to obtain the input vector of the coupling layer CL; applying the coupling layer CL to obtain the output vector of the coupling layer CL; and applying a further party of the model to at least the output vector of the coupling layer to obtain a model output of the model.

The input vector of the coupling layer CL may be divided into a first input part x1, 510 and a second input party x2, 511. This may be done by splitting the input vector into two non-overlapping parts. For example, the first input part may comprise a subset of channels of an activation volume represented by the input vector, and the second input part may comprise the remaining channels. Various other splits are also possible. It was found to be beneficial for first input part x1 to comprise at least as many values as second input part x2, e.g., at least twice as many or at least three times as many. Both parts may comprise multiple values, e.g., first input part x1 and/or second input part x2 may comprise at least 16 or at least 32 integer values. It is in principle possible to divide the input vector into two parts in other ways than splitting, e.g., generally, any invertible function from the set of input vectors to the set of pairs of first and second input parts may be used.

The coupling layer may comprise a machine learnable submodel SM, 530, that may be applied to the first input part x1. The machine learnable submodel SM may be trained to determine, from the first input part x1, a prediction x2p, 540, of the second input part x2. The machine learnable submodel may output the prediction in various ways. For example, for an element of the first input part x1, the prediction x2p may comprise a predicted value. The prediction x2p may also comprise respective probabilities that the element has respective values, with the highest probability defining which value is predicted, etc. For example, if the elements of the second input vector x2 are bits, then submodel SM may be a binary classifier classifying each bit of the second input vector x2 into two classes corresponding to the two possible values. In any case, for each respective element of the second input part x2, a respective predicted value may be comprised in, or derived from, the prediction x2p.

Various types of machine learnable submodel SM can be used. The machine learnable submodel SM does not need to have discrete outputs: the outputs can be continuous. The machine learnable submodel SM also does not need to be invertible, e.g., the submodel output can have fewer features than the input part x1 to which it is applied. Conventional machine learnable models can be used. For example, submodel SM may comprise an artificial neural network, such as a deep neural network. For example, submodel SM may comprise at least 5 or at least 10 layers, and/or comprise at least 1000 or at least 10000 nodes and/or weights. Depending on the particular application, various conventional architectures for neural networks and other types of machine learnable model may be used. It is generally beneficial from the point of view of efficiency of training to use a machine learnable submodel SM which is amenable to gradient-based optimization, e.g., which is continuous and/or differentiable in its set of parameters.

In particular, submodel SM may comprise a convolutional neural network, e.g., a neural network comprising one or more convolutional layers. In a convolutional layer, a convolution operator may be applied to an input volume to obtain an output volume. There can be at least two or at least five convolutional layers, for example. The model may comprise other layers, e.g., fully connected layers, as well. Convolutional neural networks are particularly suited to images and similar types of model inputs. For example, the submodel SM may be an image-to-image transformation model predicting one or more channels of an activation volume represented by the input vector from one or more other channels of the activation volume. Various image-to-image transformation models are conventional in the related art.

The coupling layer CL may further comprise a mapping Map, 550, that is applied to the second input part x2 to obtain second output part y2, 581. The mapping Map may be defined by the prediction x2p of the second output part. The mapping Map may be invertible, e.g., given a prediction x2p, the mapping defined by that prediction x2p may be an invertible mapping from second input parts x2 to second output parts y2.

Interestingly, the mapping Map may be defined in such a way that a predicted value of an element of the second input part x2 is mapped to a fixed value X independent from the predicted value. That is, the second output part y2 may comprise an element corresponding to the element of the second input part x2. Regardless of what particular value is predicted for the element, the mapping may be defined such that this value is mapped to the fixed value X. For example, if the element is predicted to be zero, then zero is mapped to X; if the element is predicted to be one, then one is mapped to X; etc. Values other than the predicted value can in principle be mapped to any value. The fixed value can, e.g., be 0 or 1. The fixed value can be the same for each element of the second input part x2, but this is not needed.

For example, the mapping Map may act elementwise on elements of the second input part x2 based on their respective predictions x2b, resulting in respective elements of the second output part y2. However, in principle, an elementwise mapping is not necessary, e.g., the value that an element is mapped to if it is incorrectly predicted, may depend on other values and/or their predictions as well. For example, a second input part x2 that only contains incorrect predictions may in principle be mapped to any second output part y2 as long as the overall mapping from second input parts x2 to second output parts y2 remains invertible.

As a concrete example, the elements of the second input part x2 and the second output vector y2 may both be bits. In this case, the mapping Map may act on an element of the second input vector by applying a conditional bitflip based on its predicted value. For example, for a particular element x2 of the second input part x2, the submodel SM may output a probability p $(x_2|x_1)$ of the bit being set. This probability may be used by mapping Map to map the element x2 to an element y2 of the second output part y2. For example, the bit may be flipped if it is predicted to be set, and kept unchanged otherwise. For example, mapping Map may be defined as $$\left\{ \begin{array}{ll} \text{if } p(x_2|x_1) \geq 0.5 \text{ then } & x_2 = \textit{bitflip}(y_2) \\ \text{else} & x_2 = y_2 \end{array} \right\}.$$

Similarly, it is also possible to flip the bit if it is not set and keep it unchanged otherwise.

As another example, when using discrete values from the modulo integer space $\{0, 1, \ldots, K-1\}$, a mapping $y_i = x_{i,p} + \alpha \cdot (x_i - x_{i,p})$ mod K may be used, where $x_{i,p}$ is the predicted value and $\alpha$ is any value coprime with K, e.g., $\alpha = 1$.

The first input part x1 and the second output part y2 may be combined to obtain the output vector. Typically, the first input part x1 and the second output part y2 are concatenated, e.g., as x1∥y2. That is, the output vector may comprise the first input part x1 and the second output part y2. In principle, however, other invertible maps from the first input part x1 and second output part y2 to the output vector may be used.

Figure 5B:
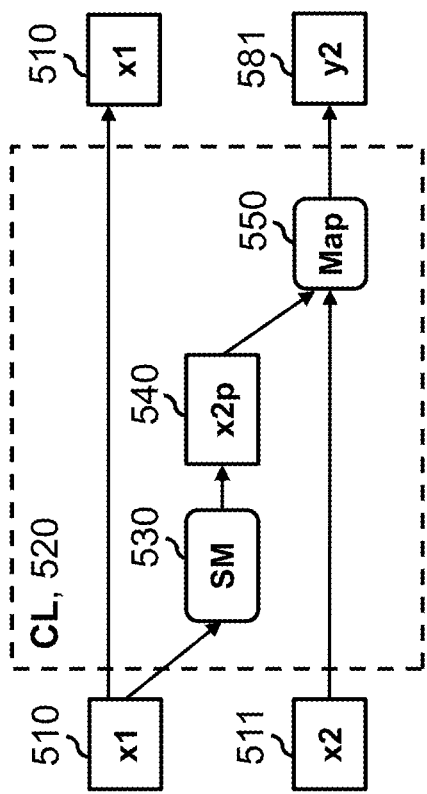
FIG. 5B shows a detailed example of how to apply an inverse coupling layer, in accordance with an example embodiment of the present invention.

FIG. 5B shows a detailed, yet non-limiting, example of how to apply an inverse coupling layer, in other words, how to apply a coupling layer CL, 520, in the inverse direction. The coupling layer of FIG. 5B is the same as that of FIG. 5A, e.g., it has the same trained parameters. In particular, the submodel SM, 530, is the same and is parameterized by the same set of parameters.

In this figure, coupling layer CL is applied in the inverse direction to determine its input vector from its output vector.

Based on the output vector, a first input part x1, 510, and a second output part y2, 581, may be determined. This may be done by inverting the process used to determine the output vector in FIG. 5A, e.g., by splitting the output vector into two parts x1, y2 according to the same split used when training the model.

Interestingly, since the first input part x1 can be derived from the output vector, it is now possible to apply machine learnable submodel SM to the first input part x1 to obtain a submodel output x2p, 540, as in FIG. 5A. As in that figure, the submodel output x2p may provide a prediction of the second input part x2, 511, of the input vector of the coupling layer CL.

Second input part x2 may be then be determined by applying an inverse IMap, 550', of the mapping Map applied in FIG. 5A. As in that figure, the inverse mapping IMap may be defined by the prediction x2p of the second input part. The inverse mapping may map the fixed value of FIG. 5A to the value predicted by prediction x2p. For example, if mapping Map is applied elementwise, then the inverse mapping IMap may be applied elementwise as well. For example, when using a mapping Map that flips the bit x2 if it is predicted to be set, the inverse mapping IMap may be defined as follows:

$$\left\{ \begin{array}{ll} \text{if } p(x_2|x_1) \geq 0.5 \text{ then } & x_2 = \textit{bitflip}(y_2) \\ \text{else} & x_2 = y_2 \end{array} \right\}.$$

As another example, when using the mapping $y_i = x_{i,p} + \alpha \cdot (x_i - x_{i,p})$ mod K in the forward direction, the inverse mapping IMap may be defined as $x_i = x_{i,p} + \alpha^{-1}(y_i - x_{i,p})$ mod K.

It may be observed that the computation of FIG. 5B indeed provides an inverse of the computation of FIG. 5A.

Deterministically applying the coupling layer in the forward direction followed by the inverse direction, and/or in the inverse direction followed by the forward direction, may result in an identity transformation, e.g., for each possible input vector or output vector. The coupling layer may be an invertible map on the whole set of possible values.

Figure 5C:
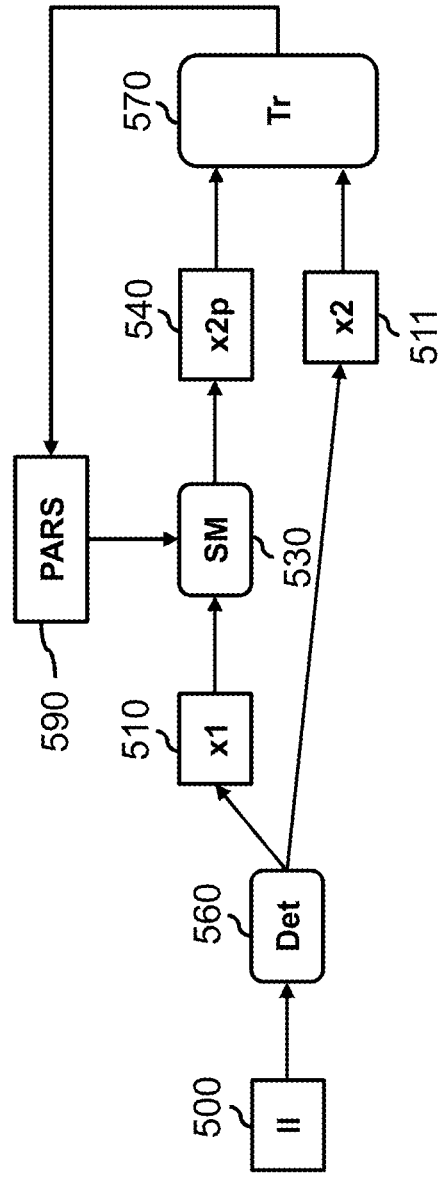
FIG. 5C shows a detailed example of how to train a submodel, in accordance with an example embodiment of the present invention.

FIG. 5C shows a detailed, yet non-limiting, example of how to train a machine learnable submodel SM, 530, of a coupling layer, e.g., coupling layer CL of FIGS. 5A and 5B. The coupling layer is part of a machine learnable model, e.g., an image analysis model.

In this figure, machine learnable submodel SM is trained to determine a prediction x2p, 540, predicting a second input part x2, 511, of an input vector of the coupling layer from a first input part x1, 510, of the input vector.

The first and second input parts x1, x2, may be obtained by selecting a training image II, 500, from a training dataset, and determining Det, 560 the input parts x1, x2, from the training image II (or other type of model input). Exactly how the determining Det is performed, depends on where in the machine learnable model the coupling layer occurs. For example, the coupling layer may be applied to the image II directly, in which case the input parts x1, x2 may be determined from the image II directly as described for FIG. 5A. The coupling layer may also follow from the input image II according to one or more layers without parameters, e.g., a squeeze layer and/or a permutation layer applying a fixed permutation, in which case the determining Det may involve applying these layers to the input image II. There may also be one or more other coupling layers preceding the present coupling layer in the machine learnable model. In this case, the other coupling layers may have been trained prior to training the present coupling layer, so that the determining Det can apply the preceding coupling layers.

Given pairs of first and second input parts x1, x2 for respective training input images II, the submodel SM may be trained to predict the second input part x2 of the input vector from the first input part x1. Various conventional training techniques are conventional and can be applied herein. Illustrated in the figure is a training operation Tr, 570, that compares the predicted second input part x2$p$ to the actual second input part x2, and derives a training signal based on the comparison, e.g., in order to minimize a loss function that includes a difference between the prediction and the actual value. The training signal may be used to update the set of parameters PARS, 590, of the submodel SM.

Training may be performed using stochastic approaches such as stochastic gradient descent, e.g., using the Adam optimizer as described in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches, e.g., of at most or at least 64 or at most or at least 256 instances.

Generally, coupling layers as described herein may be applied in a wide range of image analysis models or other types of machine learning models. The image analysis model can for example be an image feature extraction model; an image generation model, when used in the inverse direction; or an image anomaly detection model. Thus, the model output of the model can also be of various types. In various embodiments, the model output is a set of values drawn from a probability distribution, e.g., from a joint distribution of several probability distributions. For example, the number of values can be at least 128, at least 1024, or at least 2048. The number of probability distributions in the joint can be at least 16, at least 32, or there can be a probability distribution corresponding to each value of the model input, for example. The model output can for example also be an image, e.g., the model may be an image-to-image transformation model. For example, the output image can have the same size as the input image.

The model can comprise one or more coupling layers as described herein, e.g., at least 4 or at least 8. The coupling layers may be applied in parallel, e.g., to respective parts of a layer input, and/or in sequence, e.g., in different layers with the input of one coupling layer being based on the output of another coupling layer.

The model can follow various conventional architectures that are in the related art. The model can be a flow-based generative model, e.g., a model that represents a data distribution by performing multiple invertible transformations on a base distribution. The model can be an invertible model, e.g., a model that, in use, can deterministically determine a model output from a model input in a forward direction, and can deterministically determine a model input from a model output in an inverse direction. The function defined by the inverse direction may be an inverse of the function defined by the forward direction. Coupling layers as described herein may be evaluated efficiently both in the forward and in the inverse direction and so may be particularly suitable for use in invertible models. Generally, in any machine learning model, one, more, or all coupling layers having input and/or output vectors of discrete values may be advantageously replaced by coupling layers as described herein, provided their inputs can be determined during the training. Here, a coupling layer is generally referred to as a layer that can be evaluated in the forward and inverse directions, typically based on including an input part in the model output.

Figure 6:
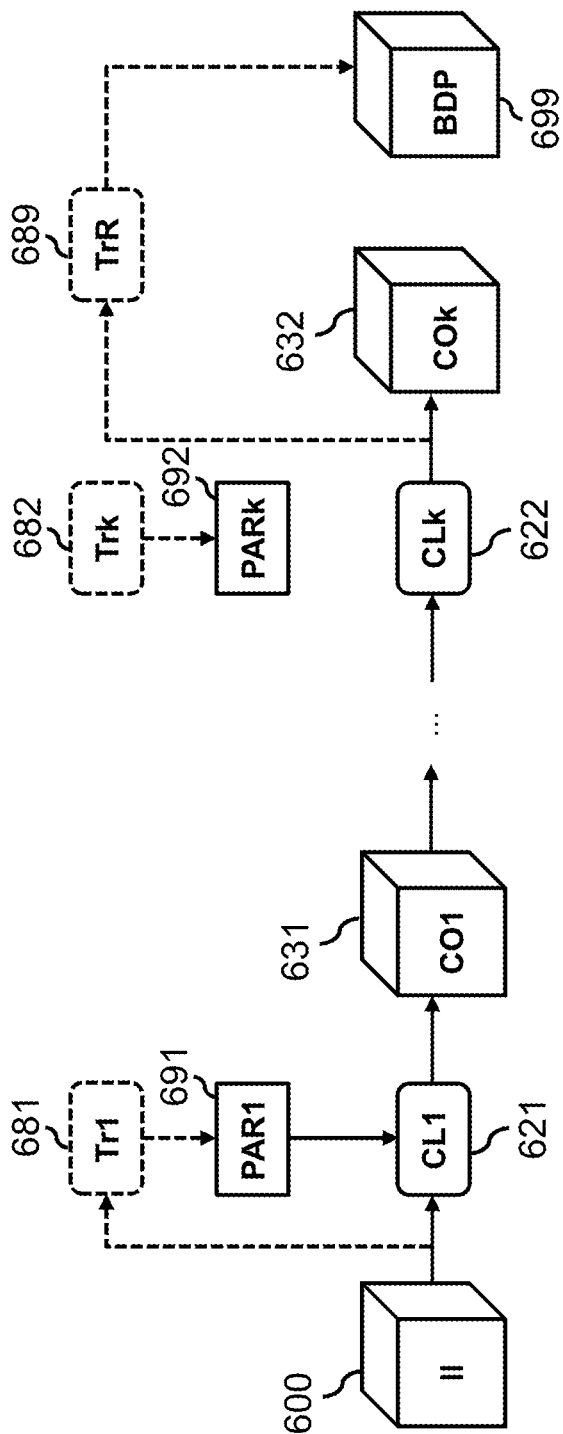
FIG. 6 shows a detailed example of a model comprising coupling layers, in accordance with an example embodiment of the present invention.

FIG. 6 shows a detailed, yet non-limiting, example of a machine learnable model comprising coupling layers. In this example, an input image II, 600, is passed through a sequence of coupling layers CL1, 621, up to CLk, 622, for example, one, two, at most or at least 4, or at most or at least 8 coupling layers CLi as described herein. The respective coupling layers are parameterized by respective sets of parameters PAR1, 691, up to PARK, 692. The parameters PARi of a coupling layer may comprise parameters of a machine learnable submodel as described herein. The respective coupling layers result in respective output vectors CO1, 631, up to COk, 632.

The coupling layer outputs CLi may be activation volumes of the same size as the input image II, for example, or obtained by rescaling. For example, the image may be of dimensions m×n×c, where the number of channels c=1 (e.g., for black-and-white or greyscale) or c=3 (e.g., for RGB). A coupling layer may for example have dimensions m×n×c, ½m×½n×4c, or ¼m×¼n×16c. When applied to an activation volume, the split into first and second input parts may be according to channels of the activation volume, e.g., one or more channels may be assigned to the first input part and one or more channels may be assigned to the second input part. It is preferred if this split differs between the coupling layers CLi to Generally, the input of a coupling layer CLi may be based on the output of a preceding coupling layer CLi−1. The input of the first coupling layer CL1 may be based on the input image II. As shown in this image, the first coupling layer CL1 may be applied directly to the input image II. A next coupling layer CLi may be applied directly to an output COi−1 of a preceding coupling layer. However, it is also possible to have layers or other types of transformations in between. These layers or other types of transformations are typically not parameterized, at least not by parameters that are trained as part of the training TrR of the remainder of the machine learnable model, as discussed below.

For example, a coupling layer may be preceded by one or more squeeze operations, and/or one or more channel permutations. A squeeze layer may be a layer for reducing spatial dimensions of its activation volume, e.g., by a factor two, four, or more, and increasing the number of channels accordingly, e.g., by a factor four, sixteen, or more. A channel permutation may permute the channels of the activation volume, e.g., according to a random but fixed permutation.

The machine learnable model may comprise various trainable parts apart from the coupling layers CLi. In this particular example, the model output corresponds to the output Cok of the final coupling layer CLk, but in general, additional trainable and/or untrainable layers may be applied to the output of the final coupling layer CLk to obtain the model output.

As shown in the figure, the trainable parts may comprise parameters BDP, 699, of a base distribution. The base distribution may be a probability distribution of the model output. The model output may represent the input image II in terms of values drawn from the base distribution. For example, in case the model output is binary, a factorized Bernoulli distribution may be used. In this case, the parameters BDP of the base distribution may define, for each element of the model output, a probability that the element is equal to one or zero. More generally, a joint distribution of respective categorical distributions for respective elements of the model output may be used. Various other possibilities are also possible, e.g., the model output may be divided into k-by-k patches, in which case the probability distribution may be a joint distribution of probability distributions defined over the respective patches.

By fitting the base distribution BDP to the data during training, it may be determined in use how likely a model output is according to the base distribution. Based on this, a likelihood, e.g., a log-likelihood, may be determined of the input image II occurring according to the training dataset. Such likelihoods may be used for example for conformance checking and for compression. In compression, more likely model outputs may be assigned shorter encodings than less likely model outputs.

The figure also illustrates the training of the machine learnable model by first training the coupling layers and then training the remainder of the model. Training operations are indicated in the figure by dashed lines.

As shown in the figure, training the model may start with training Tr1, 681, the first coupling layer CL1. This may be possible since the input vector to which the first coupling layer is applied, can be computed from the input image II without needing parameters that have not been trained yet, e.g., parameters of subsequent coupling layers or of the remainder of the model. As a result of the training Tr1, the parameters PAR1, 691, of the first coupling layer CL1 may be determined.

Having trained the first coupling layer, also subsequent coupling layers, e.g., up to coupling layer CLk, 622, may be trained in respective training operations, e.g., training Trk, 682. A coupling layer may be trained whenever the parameters needed to determine its input from the input image II, e.g., parameters of earlier coupling layers, have been trained. For example, the coupling layers may be trained left-to-right. The training may result in respective sets of parameters, e.g., parameters PARK, 692. Once a coupling layer is trained, its parameters PARi may remain fixed throughout the subsequent training.

Having trained the coupling layers CL1, . . . , CLk, the remainder of the model may be trained TrR, 689. In this example, this involves fitting the parameters BDP of the base distribution of the model. Instead or in addition of fitting base distribution parameters, the training TrR of the remainder of the model may involve learning parameters of additional trainable layers the model, for example.

Generally, training TrR may be performed using conventional techniques, including stochastic approaches such as stochastic gradient descent, e.g., using the Adam optimizer as described in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches, e.g., of at most or at least 64 or at most or at least 256 instances. In the particular example of this figure, the training TrR of the remainder of the model only involves fitting the parameters of the base distribution BDP to the model outputs COk. This may be done efficiently without the need to perform a stochastic optimization. For example, for a factorized Bernoulli distribution, training TrR the remainder of the model may involve determining the base distribution parameters BDP by counting for individual elements of the model output COk how often they are zero or one.

Typically, respective training operations Tr1, . . . , Trk, TrR all use the same training dataset. For example, during training, an input vector that is used in a training operation Tri to train a coupling layer to predict a second input part from a first input part, may also be used in training operation TrR to train the overall model, in which case the training of the overall model may involve applying the coupling layer to that same input vector. However, this is not strictly needed, e.g., the training datasets for training Tri a coupling layer and training TrR the overall model may be only partially overlapping, or even completely disjoint.

FIG. 7 shows a block-diagram of computer-implemented method 700 of training a machine learnable model, e.g., an image analysis model. The model may comprise a coupling layer configured to determine an output vector of discrete values from an input vector of discrete values. The method 700 may correspond to an operation of the system 100 of FIG. 1.

However, this is not a limitation, in that the method 700 may also be performed using another system, apparatus or device.

The method 700 may comprise, in an operation titled "ACCESS TRAINING DATA", accessing 710 a training dataset. The training dataset may comprise one or more training input instances, e.g., training images.

The method 700 may comprise, in an operation titled "ACCESS PARAMETERS", accessing 720 a set of parameters of the model. The set of parameters may comprise parameters of a machine learnable submodel of the coupling layer.

The method 700 may comprise, in an operation titled "TRAIN SUBMODEL", training 730 the machine learnable submodel of the coupling layer. The training 730 of the submodel may comprise, in an operation titled "OBTAIN INPUT VECTOR", obtaining 732 an input vector of the coupling layer corresponding to a training input instance of the training dataset. The training 730 may further comprise, in an operation titled "TRAIN TO PREDICT 2ND PART", training 734 the machine learnable submodel to predict a second input part of the input vector from a first input part of the input vector.

The method 700 may comprise, in an operation titled "TRAIN MODEL", training 740 the model on the training dataset. The training may be performed after training 730 is completed, and the training 740 may leave the parameters of the machine learnable submodel fixed. The training 740 may comprise, in an operation titled "APPLY COUPLING LAYER", applying 750 the coupling layer to an input vector to obtain an output vector. Applying 750 may comprise, in an operation titled "PREDICT 2ND PART", applying 752 the machine learnable submodel to a first input part of the input vector to obtain a prediction of a second input part of the input vector. Applying 750 may comprise, in an operation titled "MAP ACCORDING TO PREDICTION", applying 754 an invertible mapping to the second input part to obtain a second output part. The mapping may be defined by the prediction of the second input part. The mapping may map a predicted value of an element of the second input part to a fixed value independent from the predicted value. Applying 750 may comprise, in an operation titled "COMBINE PARTS", combining 756 the first input part and the second output part to obtain the output vector.

FIG. 8 shows a block-diagram of computer-implemented method 800 of applying a machine learnable model, e.g., an image analysis model. The model may comprise a coupling layer configured to determine an output vector of discrete values from an input vector of discrete values. The method 800 may correspond to an operation of the system 200 of FIG. 2 or the system 300 of FIG. 3. However, this is not a limitation, in that the method 800 may also be performed using another system, apparatus or device.

The method 800 may comprise, in an operation titled "ACCESSING MODEL", accessing 810 a set of parameters of the model. The model may have been trained on a training dataset according to a method described herein. The set of parameters may comprise parameters of a machine learnable submodel of the coupling layer.

The method 800 may comprise, in an operation titled "OBTAIN INPUT", obtaining 820 a model input, e.g., an input image, and, in an operation titled "APPLY MODEL", applying 830 the model to the input to obtain a model output.

Instead of or in addition to the obtaining 820 and the applying 830, the method 800 may comprise, in an operation titled "OBTAIN OUTPUT", obtaining 840 a model output, and, in an operation titled "APPLY INVERSE", applying 850 an inverse of the model to the model output to obtain a model input, e.g., an input image.

The applying 830 and/or the applying 850 may comprise, in an operation titled "PREDICT 2ND PART", applying 852 the machine learnable submodel to a first input part of an input vector of the coupling layer to obtain a prediction of a second input part of the input vector. The applying 830 and/or the applying 850 may further comprise, in an operation titled "MAP ACCORDING TO PREDICTION", applying 854 an invertible mapping to the second input part to obtain a second output part of an output vector of the coupling layer. The mapping may be defined by the prediction of the second input part. The mapping may map a predicted value of an element of the second input part to a fixed value independent from the predicted value It will be appreciated that, in general, the operations of method 800 of FIG. 7 and method 800 of FIG. 8 may be performed in any suitable order, e.g., consecutively, simultaneously, or a combination thereof, subject to, where applicable, a particular order being necessitated, e.g., by input/output relations. Some or all of the methods may also be combined, e.g., method 800 of applying a trained model may be applied subsequently to this trained model being trained according to method 700.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 900. Alternatively, the computer readable medium 1100 may comprise transitory or non-transitory data 910 representing a set of parameters of an image analysis model trained as described herein, in particular comprising parameters of a machine learnable submodel of a coupling layer.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device described as including several means, several of these means may be embodied by one and the same item of hardware. The mere fact that certain measures are described does not indicate that a combination of these measures cannot be used to advantage.

What is claimed is:

1. A computer-implemented method of training an image analysis model, the image analysis model including a coupling layer configured to determine an output vector of discrete values from an input vector of discrete values, the method comprising the following steps:
   accessing a training dataset, the training dataset including one or more training images;
   accessing a set of parameters of the image analysis model, the set of parameters including parameters of a machine learnable submodel of the coupling layer;
   training the machine learnable submodel of the coupling layer, including obtaining an input vector of the coupling layer corresponding to a training image of the training dataset, and training the machine learnable submodel to predict a second input part of the input vector from a first input part of the input vector;
   training the image analysis model on the training dataset, including applying the coupling layer to an input vector to obtain an output vector by:
      applying the machine learnable submodel to a first input part of the input vector to obtain a prediction of a second input part of the input vector,
      applying an invertible mapping to the second input part to obtain a second output part, wherein the mapping is defined by the prediction of the second input part, and wherein the mapping maps a predicted value of an element of the second input part to a fixed value independent from the predicted value,
      combining the first input part and the second output part to obtain the output vector.

2. The method of claim 1, wherein the applying of the machine learnable submodel includes applying a convolutional neural network.

3. The method of claim 2, wherein the element of the second input party is a bit.

4. The method of claim 3, wherein: (i) the mapping flips the bit when it is predicted to be set, or (ii) the mapping flips the bit when it is predicted not to be set.

5. The method of claim 1, further comprising training a further machine learnable submodel of a further coupling layer, wherein an input vector of the further coupling layer is based on the output vector of the coupling layer.

6. The method of claim 1, wherein the training of the image analysis model leaves parameters of trained coupling layers fixed.

7. The method of claim 1, wherein the image analysis model is configured to determine a representation of an input image in terms of a values drawn from a probability distribution.

8. A computer-implemented method of applying an image analysis model, the image analysis model including a coupling layer configured to determine an output vector of discrete values from an input vector of discrete values, the method comprising the following steps:

accessing a set of parameters of the image analysis model, the image analysis model being trained on a training dataset, and wherein the set of parameters includes parameters of a machine learnable submodel of the coupling layer;

obtaining an input image and applying the image analysis model to the input image to obtain a model output, and/or obtaining a model output and applying an inverse of the image analysis model to the model output to obtain an input image;

wherein the applying of the image analysis model and/or the applying of the inverse includes applying the machine learnable submodel to a first input part of an input vector of the coupling layer to obtain a prediction of a second input part of the input vector, and applying an invertible mapping to the second input part to obtain a second output part of an output vector of the coupling layer, wherein the mapping is defined by the prediction of the second input part, and wherein the mapping maps a predicted value of an element of the second input part to a fixed value independent from the predicted value.

9. The method of claim 8, further comprising:
applying the image analysis model to the input image, and applying a lossy or lossless compression function to the model output to obtain a compression of the input image; and/or
applying a lossy or lossless decompression function to a compression of an input image to obtain the model output, and applying the inverse of the image analysis model to the model output to recover the input image.

10. The method of claim 8, further comprising applying the image analysis model to the input image to obtain the model output, wherein the model output represents the input image in terms of a values drawn from a probability distribution; and determining a conformance value based on the set of parameters, wherein the conformance value indicates a conformance of the input image to the training dataset.

11. The method of claim 8, wherein the model output represents the input image in terms of a set of values drawn from a probability distribution, and wherein the method further comprises obtaining the model output by sampling the set of parameters from the probability distribution; and applying the inverse of the image analysis model to the model output to determine a synthetic image representative of the training dataset.

12. A system for training an image analysis model, the image analysis model including a coupling layer configured to determine an output vector of discrete values from an input vector of discrete values, wherein the system comprises:

a data interface configured to access a training dataset, wherein the training dataset includes one or more training images, to access a set of parameters of the image analysis model, wherein the set of parameters comprises parameters of a machine learnable submodel of the coupling layer;

a processor subsystem configured to:
train the machine learnable submodel of the coupling layer, including obtaining an input vector of the coupling layer corresponding to a training image of the training dataset, and training the machine learnable submodel to predict a second input part of the input vector from a first input part of the input vector;

train the image analysis model on the training dataset, including applying the coupling layer to an input vector to obtain an output vector by:
applying the machine learnable submodel to a first input part of the input vector to obtain a prediction of a second input part of the input vector,
applying an invertible mapping to the second input part to obtain a second output part, wherein the mapping is defined by the prediction of the second input part, and wherein the mapping maps a predicted value of an element of the second input part to a fixed value independent from the predicted value,
combining the first input part and the second output part to obtain the output vector.

13. A system for applying an image analysis model, wherein the image analysis model includes a coupling layer configured to determine an output vector of discrete values from an input vector of discrete values, the system comprising:

a data interface configured to access a set of parameters of the image analysis model, wherein the image analysis model was trained on a training dataset, and wherein the set of parameters includes parameters of a machine learnable submodel of the coupling layer;

a processor subsystem configured to:
obtain an input image and apply the image analysis model to the input image to obtain a model output, and/or obtain a model output and apply an inverse of the image analysis model to the model output to obtain an input image;
wherein the applying of the image analysis model and/or the applying of the inverse includes applying the machine learnable submodel to a first input part of an input vector of the coupling layer to obtain a prediction of a second input part of the input vector, and applying an invertible mapping to the second input part to obtain a second output part of an output vector of the coupling layer, wherein the mapping is defined by the prediction of the second input part, and wherein the mapping maps a predicted value of an element of the second input part to a fixed value independent from the predicted value.

14. The system of claim 13, further comprising:
a sensor interface for obtaining, from an image sensor, image data of the system and/or of an environment of the system;
wherein the processor subsystem is configured to apply the image analysis model to the image data.

15. A non-transitory computer-readable medium on which is stored a computer program for training an image analysis model, the image analysis model including a coupling layer configured to determine an output vector of discrete values from an input vector of discrete values, the computer program, when executed by a processor, causing the processor to perform the following steps:

accessing a training dataset, the training dataset including one or more training images;
accessing a set of parameters of the image analysis model, the set of parameters including parameters of a machine learnable submodel of the coupling layer;
training the machine learnable submodel of the coupling layer, including obtaining an input vector of the coupling layer corresponding to a training image of the training dataset, and training the machine learnable submodel to predict a second input part of the input vector from a first input part of the input vector;

training the image analysis model on the training dataset,
including applying the coupling layer to an input vector
to obtain an output vector by:
  applying the machine learnable submodel to a first
    input part of the input vector to obtain a prediction of
    a second input part of the first input vector,
  applying an invertible mapping to the second input part
    to obtain a second output part, wherein the mapping
    is defined by the prediction of the second input part,
    and wherein the mapping maps a predicted value of
    an element of the second input part to a fixed value
    independent from the predicted value,
  combining the first input part and the second output
    part to obtain the output vector.

* * * * *